(12) United States Patent
Nishimoto

(10) Patent No.: US 12,389,105 B2
(45) Date of Patent: Aug. 12, 2025

(54) ELECTRONIC APPARATUS, CONTROL METHOD FOR ELECTRONIC APPARATUS, AND COMPUTER-READABLE STORAGE MEDIUM

(71) Applicant: CANON KABUSHIKI KAISHA, Tokyo (JP)

(72) Inventor: Takumi Nishimoto, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 155 days.

(21) Appl. No.: 18/329,333

(22) Filed: Jun. 5, 2023

(65) Prior Publication Data
US 2023/0412910 A1    Dec. 21, 2023

(30) Foreign Application Priority Data
Jun. 16, 2022 (JP) ................................ 2022-097281

(51) Int. Cl.
*H04N 23/62* (2023.01)
*G06F 21/84* (2013.01)

(52) U.S. Cl.
CPC ............. *H04N 23/62* (2023.01); *G06F 21/84* (2013.01)

(58) Field of Classification Search
CPC .... H04N 23/62; H04N 23/631; H04N 23/632; H04N 23/50; H04N 23/633; H04N 23/667; G06F 21/84
See application file for complete search history.

(56) References Cited

U.S. PATENT DOCUMENTS

| | | | |
|---|---|---|---|
| 2017/0104922 A1* | 4/2017 | Matsushima | H04N 23/62 |
| 2018/0046314 A1* | 2/2018 | Nabeshima | G06F 3/04883 |
| 2022/0210320 A1* | 6/2022 | Osuka | H04N 23/633 |

FOREIGN PATENT DOCUMENTS

JP    2021-096279 A    6/2021

* cited by examiner

*Primary Examiner* — Kelly L Jerabek
(74) *Attorney, Agent, or Firm* — Cowan, Liebowitz & Latman, P.C.

(57) ABSTRACT

An electronic apparatus includes: a plurality of operation members to which functions specified by a user are assignable; and at least one memory and at least one processor which function as: an assignment unit configured to assign a function selected by the user to each of the plurality of operation members, where the functions assignable by the assignment unit includes a lock function that sets/releases a lock state in which operation for operation members is disabled; and a display control unit configured to control such that information on an operation member to which the lock function is assigned is displayed on a display unit in a case where a predetermined operation is received from the user.

14 Claims, 8 Drawing Sheets

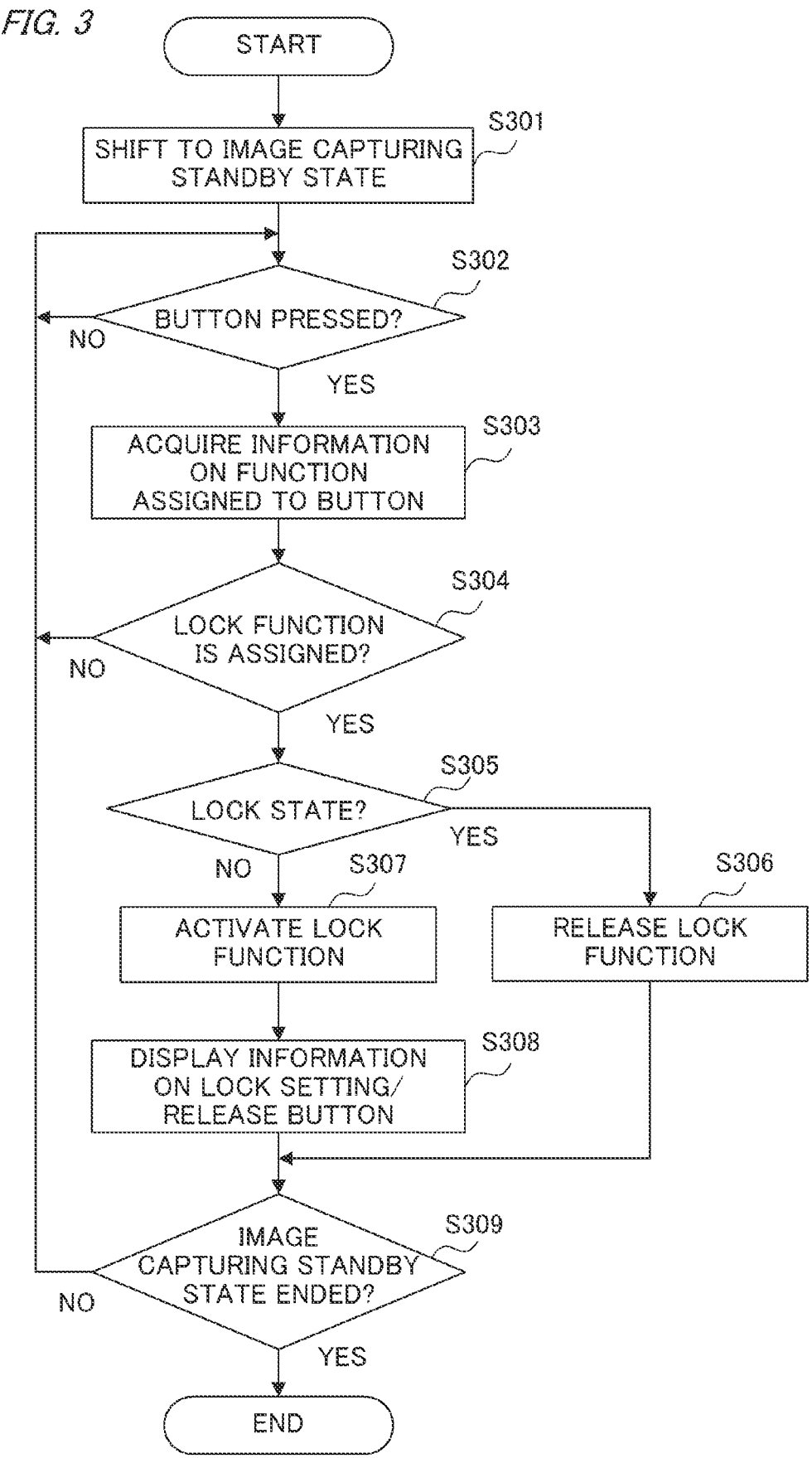

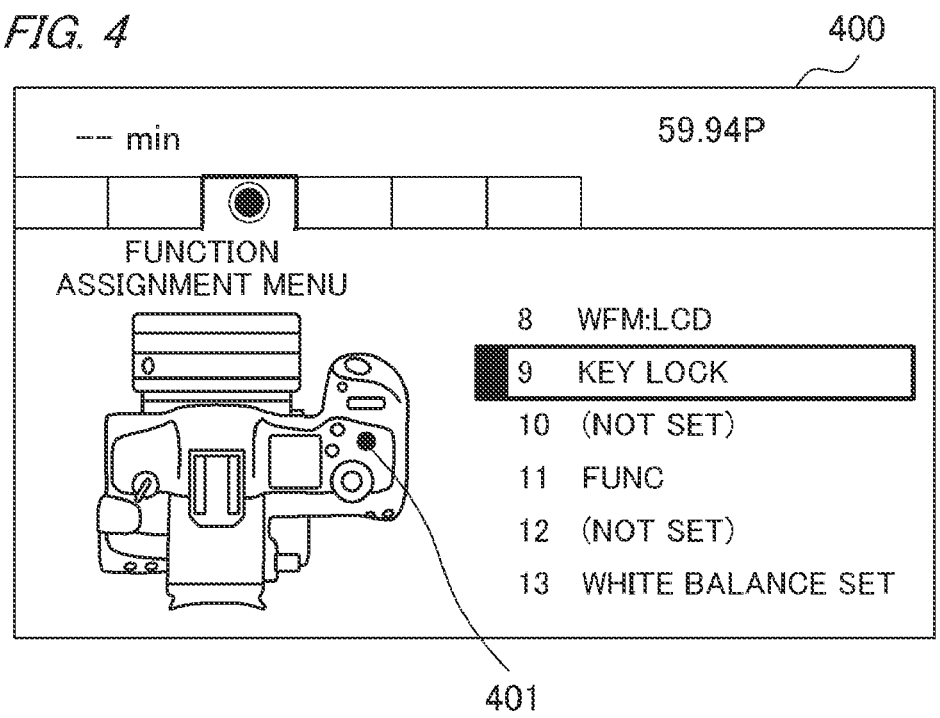

ELECTRONIC APPARATUS, CONTROL METHOD FOR ELECTRONIC APPARATUS, AND COMPUTER-READABLE STORAGE MEDIUM

BACKGROUND OF THE INVENTION

Field of the Invention

The present invention relates to an electronic apparatus, a control method for an electronic apparatus, and a computer-readable storage medium.

Description of the Related Art

In image capturing devices, imaging parameters may be changed by the movement of operation members unintended by the user. To prevent such a malfunction, some image capturing devices may include a lock lever or a lock button which has a lock function to set or release a lock state of operation members.

Japanese Patent Application Publication No. 2021-96279 discloses an electronic apparatus which, in a case where a lock operation is performed, displays information on an operation member that is a target of the lock operation.

However in some cases, even if information on the operation member that is a target of the lock operation is displayed, the user may have forgotten an operation member to be used for setting or releasing the lock state (e.g. lock lever, lock button), and is confused as to how to set or release the lock.

SUMMARY OF THE INVENTION

The present invention provides a technique to support setting and releasing the lock state for operation members.

An electronic apparatus according to the present invention includes: a plurality of operation members to which functions specified by a user are assignable; and at least one memory and at least one processor which function as: an assignment unit configured to assign a function selected by the user to each of the plurality of operation members, where the functions assignable by the assignment unit includes a lock function that sets/releases a lock state in which operation for operation members is disabled; and a display control unit configured to control such that information on an operation member to which the lock function is assigned is displayed on a display unit in a case where a predetermined operation is received from the user.

Further features of the present invention will become apparent from the following description of exemplary embodiments with reference to the attached drawings.

BRIEF DESCRIPTION OF THE DRAWINGS

FIG. 3 is a flow chart depicting display processing for lock setting/release information in Embodiment 1;

FIG. 4 is a diagram exemplifying a function assignment menu screen;

DESCRIPTION OF THE EMBODIMENTS (External View of Digital Camera) Embodiments of the present invention will be described with reference to the drawings. FIGS. 1A and 1B are external views of a digital camera 100, which is an example of an electronic apparatus to which the present invention is applicable. FIG. 1A is a front perspective view of the digital camera 100, and FIG. 1B is a rear perspective view of the digital camera 100.

Figure 1A:
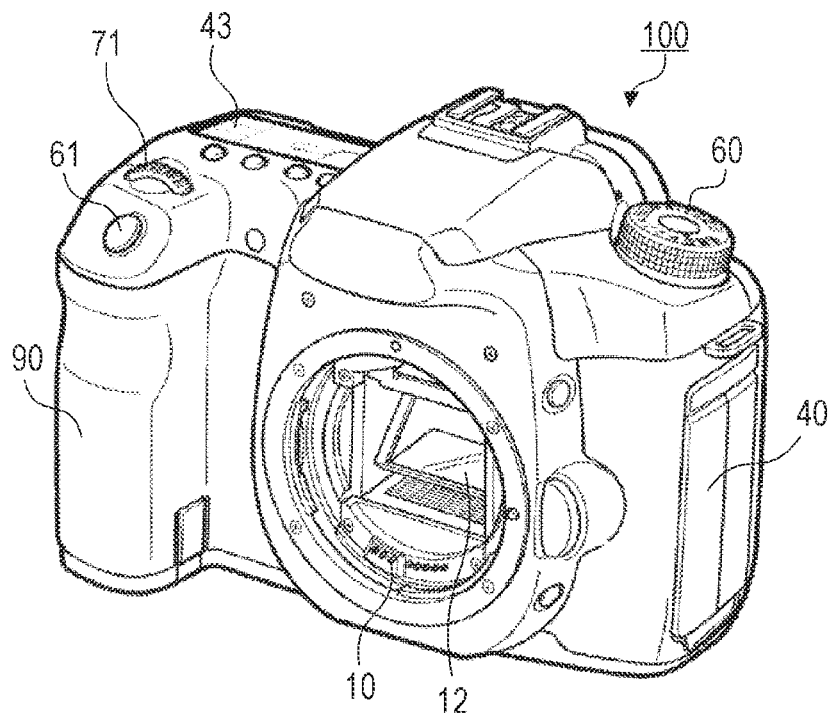
FIGS. 1A and 1B are external views of a digital camera.

A display unit 28 is a display unit disposed on a rear surface of the digital camera 100, and displays images and various information. A touch panel 70a can detect a touch operation to a display surface (touch operation surface) of the display unit 28. An extra-finder display unit 43 is a display unit disposed on an upper surface of the digital camera 100, and displays various set values of the digital camera 100, including shutter speed and aperture. A shutter button 61 is an operation member to instruct image capturing. A mode selection switch 60 is an operation member to switch various modes. A terminal cover 40 is a cover to protect connectors (not illustrated), such as a connection cable, to connect the digital camera 100 to an external apparatus.

A main electronic dial 71 is a rotational operation member, and such an operation as changing the set values of shutter speed and aperture can be performed by turning the main electronic dial 71. A power supply switch 72 is an operation member to switch the power supply of the digital camera 100 between ON/OFF. A sub-electronic dial 73 is a rotational operation member, and can perform such an operation as moving a selection frame (cursor) and switching images by turning the sub-electronic dial 73.

A delete button 70b is an operation member that is operated in a state where an image is displayed on the display unit 28, so as to delete the reproduced image. A four-direction key (cross key) 74, of which upper, lower, left and right portions can be pressed respectively, is used to perform operation corresponding to the pressed portion of the four-direction key 74. A SET button 75 is a push button that is mainly used for determining a selected item.

An LV button 76 is a button (operation member) to switch the live view display (hereafter LV display) between ON/OFF. In a moving image capturing mode, the LV button 76 is used to instruct start or stop capturing (recording) a moving image.

A magnifying button 77 is a button to switch a magnifying mode in the live view display in the image capturing mode ON/OFF, and to change the magnification ratio in the magnifying mode. In the reproduction mode, the magnifying button 77 functions as a button to magnify a reproduced image, and increase the magnification ratio thereof. A demagnifying button 78 is a button to decrease a magnification ratio of the magnified reproduced image, so as to demagnify the display image.

A reproduction button 79 is a button to switch an image capturing mode and a reproduction mode. If the reproduction button 79 is pressed during image capturing mode, the reproduction mode starts where the latest image, out of the images recorded in a recording medium 200, can be displayed on the display unit 28.

A quick return mirror 12 is a mirror to guide light which passed through the lens to an eyepiece finder 16, and is moved up/down by an actuator (not illustrated) in accordance with the instruction from a system control unit 50

(described later). A communication terminal 10 is a communication terminal for the digital camera 100 to communicate with a lens side (removable).

The eyepiece finder 16 is a look-in type finder to check the focus and composition of an optical image of a subject acquired via a lens unit 150 by observing a focusing screen 13 (described later). A cover 202 is a cover of a slot storing the recording medium 200. A grip unit 90 is a holding unit having a shape for the user to easily grip with their right hand when the digital camera 100 is held.

Figure 1B:
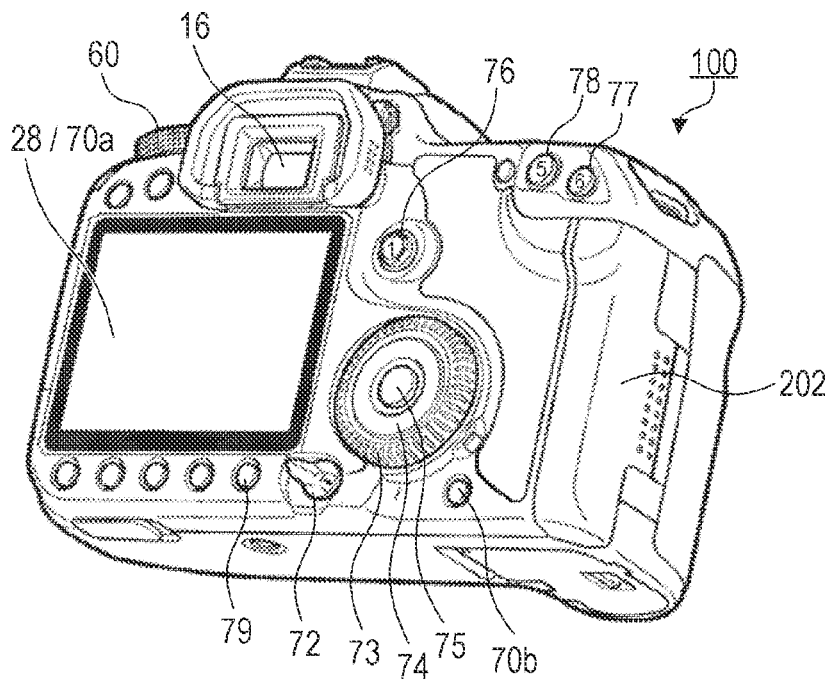

The digital camera 100 has function assigned buttons to which functions specified by the user can be assigned. The digital camera 100 can have a plurality of function assigned buttons. A symbol to identify this button is printed respectively on each function assigned button. The symbol printed on each function assigned button is a number (numeric character), for example, and in the case of FIGS. 1A and 1B, the LV button 76 corresponds to 1, the magnifying button 77 corresponds to 6, and the demagnifying button 78 corresponds to 5. The symbol corresponding to each function assigned button is not limited to a numeric character, but may be an alphabetic character, a mark, or the like. In the example of FIG. 1B, numbers (numeric characters) are attached to three buttons as function assigned buttons, but buttons to be used as function assigned buttons may be different depending on the model of the digital camera.

Figure 2:
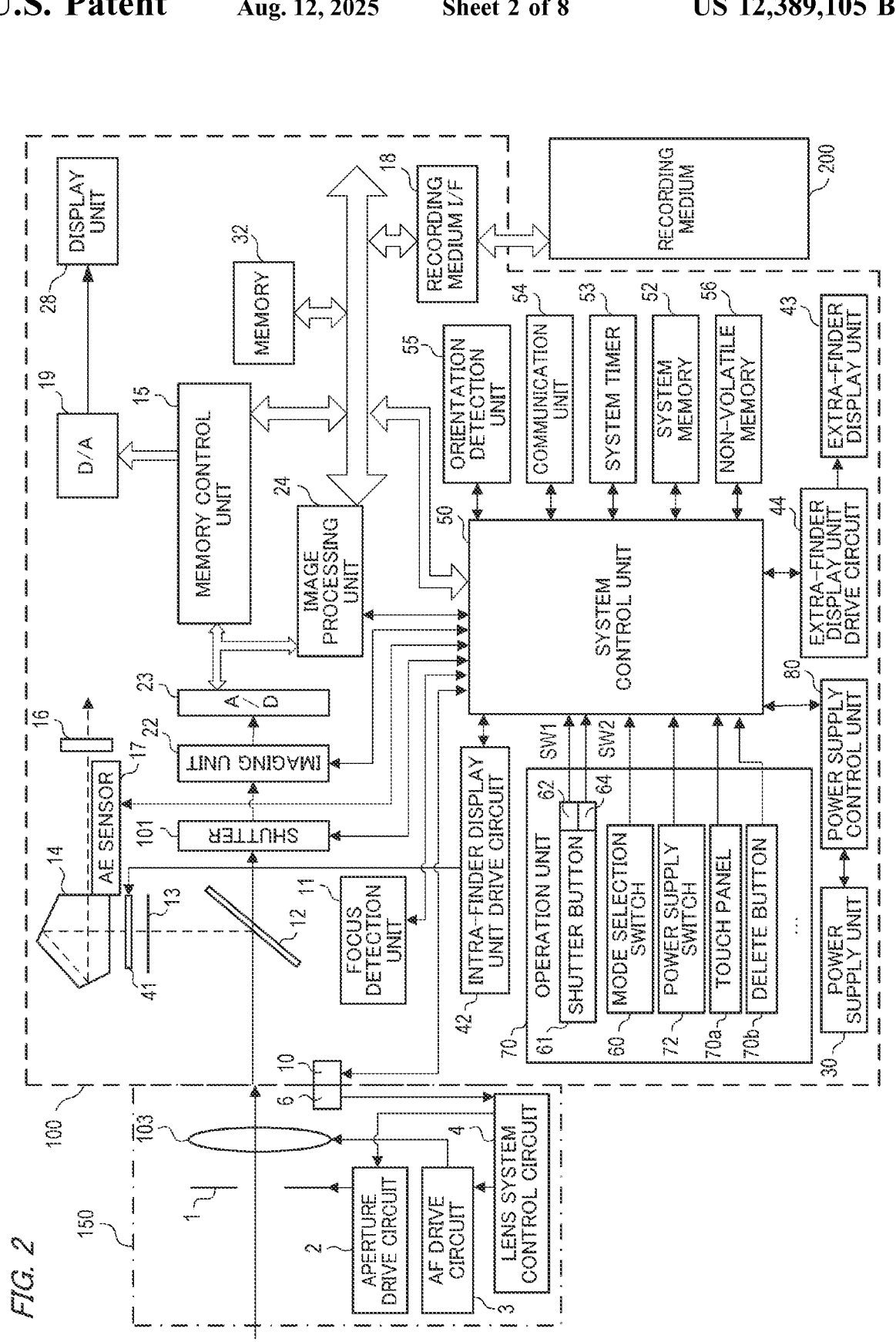
FIG. 2 is a block diagram of the digital camera.

(Block Diagram of Digital Camera) FIG. 2 is a block diagram depicting a configuration example of the digital camera 100. The lens unit 150 is a lens unit including a replaceable image capturing lens. A lens 103 is normally constituted of a plurality of lenses, but is indicated as one lens in FIG. 2 for simplification.

A communication terminal 6 is a communication terminal for the lens unit 150 to communicate with the digital camera 100, and a communication terminal 10 is a communication terminal for the digital camera 100 to communicate with the lens unit 150. The lens unit 150 communicates with the system control unit 50 via these communication terminals 6 and 10. The lens unit 150 controls an aperture 1 via an aperture drive circuit 2 using an internal lens system control circuit 4. Further, the lens unit 150 performs focusing by moving a position of the lens 103, using the lens system control circuit 4, via an AF drive circuit 3.

An AE sensor 17 measures brightness of the subject through the lens unit 150. A focus detection unit 11 outputs defocus amount information, which is a deviation amount of the focal point in the optical axis direction, to the system control unit 50. On the basis of the defocus amount information, the system control unit 50 controls the lens unit 150, and performs auto focus processing using a phase difference method (phase difference AF).

The quick return mirror 12 (hereafter mirror 12) is configured such that the lens 103 side thereof is vertically moved by an actuator (not illustrated) which receives instruction from the system control unit 50, so as to switch the path of light when exposure, live view image capturing or moving image capturing is performed. In other words, the mirror 12 switches the light which entered through the lens 103 to the eyepiece finder 16 side or to an imaging unit 22 side. As illustrated in FIG. 2, the mirror 12 is normally disposed to reflect the light and to guide the light to the eyepiece finder 16. In the case of capturing an image or performing live view display, however, the lens 103 side of the mirror 12 moves upward, away from the light (mirror is up), so that the light is guided to the imaging unit 22. The center portion of the mirror 12 is a half mirror, so that part of the light can transmit through. Part of the light transmits through the center portion of the mirror 12, and enters the focus detection unit 11 to perform focus detection.

The user observes the focusing screen 13 via a penta prism 14 and the eyepiece finder 16, so as to check a focal point and a composition of an optical image of a subject acquired through the lens unit 150.

A shutter 101 is a focal plane shutter that can freely control an exposure time of the imaging unit 22 based on control of the system control unit 50.

The imaging unit 22 is an image pickup element constituted of a CCD, a CMOS element, or the like, to convert an optical image into electric signals. The imaging unit 22 may include an imaging-plane phase-difference sensor, which outputs defocus amount information to the system control unit 50. An A/D convertor 23 converts an analog signal, which is outputted from the imaging unit 22, into a digital signal.

An image processing unit 24 performs predetermined processing (e.g. pixel interpolation, resize processing (e.g. demagnification), color conversion processing) on data from the A/D convertor 23, or data from the memory control unit 15. The image processing unit 24 also performs predetermined arithmetic processing using the captured image data. The system control unit 50 performs exposure control and distance measurement control based on the arithmetic operation result acquired by the image processing unit 24. Thereby a through-the-lens (TTL) type auto focus (AF) processing, auto exposure (AE) processing, pre-flash emission (FE) processing, and the like are performed. Furthermore, the image processing unit 24 performs predetermined arithmetic processing using the captured image data, and performs TTL type auto white balance (AWB) processing based on the acquired arithmetic operation result.

The output data from the A/D convertor 23 is written to a memory 32 via the image processing unit 24 and memory control unit 15, or the output data from the A/D convertor 23 is written to the memory 32 via the memory control unit 15 alone without using the image processing unit 24. The memory 32 stores image data, which is acquired by the imaging unit 22 and converted into digital data by the A/D convertor 23, and image data to be displayed on the display unit 28. The memory 32 has a storage capacity that is sufficient for storing a predetermined number of still images, and a predetermined duration of moving images and sound.

The memory 32 also plays a role of a memory for displaying images (video memory). A D/A convertor 19 converts image data for display, stored in the memory 32, into analog signals, and supplies the analog signals to the display unit 28. Thus the image data for display, written in the memory 32, is displayed on the display unit 28 via the D/A convertor 19. The display unit 28 performs display in accordance with the analog signals from the D/A convertor 19 on a display, such as a liquid crystal display (LCD) or an organic EL.

If the digital signals, which were A/D-converted by the A/D convertor 23 and stored in the memory 32, are converted into an analog signals by the D/A convertor 19 and sequentially transferred to and displayed on the display unit 28, the display unit 28 can function as an electronic view finder (EVF). The display unit 28 can perform through-image display (live view display) as an electronic view finder like this.

A frame to indicate a distance measurement point at which auto focus is currently performed (AF frame), icons to indicate the setting state of the camera, and the like are displayed on an inner-finder display unit 41 via an inner-finder display unit drive circuit 42. Various setting values of the camera, including a shutter speed and an aperture, are displayed on the extra-finder display unit 43 via an extra-finder display unit drive circuit 44.

A non-volatile memory 56 is an electrically erasable/rechargeable memory, such as an EEPROM. In the non-volatile memory 56, constants, programs and the like, for operation of the system control unit 50, are stored. "Program" here refers to programs for executing various flow charts to be described later in the present embodiment.

The system control unit 50 is a control unit constituted of at least one processor or circuit, and controls the digital camera 100 in general. The system control unit 50 implements each processing of the present embodiment by executing programs recorded in the non-volatile memory 56. A system memory 52 is a RAM, for example. The system control unit 50 also develops constants and variables for operating the system control unit 50, programs read from the non-volatile memory 56, and the like in the system memory 52. Further, the system control unit 50 performs display control by controlling the memory 32, the D/A convertor 19, the display unit 28, and the like.

A system timer 53 is a timer unit to measure the time used for various controls and to measure the time of the internal clock.

A communication unit 54 performs transmission/reception of video signals and audio signals with external apparatuses connected wirelessly or via cable. The communication unit 54 is connectable to a wireless local area network (LAN) or internet. The communication unit 54 is also communicable with an external apparatus via Bluetooth® or Bluetooth Low Energy. The communication unit 54 can send an image (including a through image) captured by the imaging unit 22, and an image recorded in the recording medium 200, and can receive image data or various other information from an external apparatus.

An orientation detection unit 55 detects an orientation of the digital camera 100 with respect to the gravity direction. On the basis of the orientation detected by the orientation detection unit 55, it can be determined whether the image captured by the imaging unit 22 is an image captured by the digital camera 100 held horizontally, or an image captured by the digital camera 100 held vertically. The system control unit 50 can attach the orientation information, in accordance with the orientation detected by the orientation detection unit 55, to an image file of an image captured by the imaging unit 22, or can rotate an image thereby. For the orientation detection unit 55, an acceleration sensor, a gyro sensor or the like can be used.

A recording medium OF 18 is an interface with the recording medium 200, such as a memory card and a hard disk. The recording medium 200 is a recording medium to record captured images, such as a memory card, and is constituted of a semiconductor memory, a magnetic disk, or the like.

A power supply control unit 80 is constituted of a battery detection circuit, a DC-DC convertor, a switch circuit to select a block to be energized, and the like, and detects whether a battery is installed or not, a type of battery, and a residual amount of battery charge. The power supply control unit 80 also controls the DC-DC convertor based on this detection result and instructions from the system control unit 50, and supplies the required voltage to each portion, including the recording medium 200, for a required period of time. A power supply unit 30 is constituted of a primary battery (e.g. alkali battery, lithium battery), a secondary battery (e.g. NiCd battery, NiMH battery, Li battery), and an AC adapter, and the like.

An operation unit 70 is an input unit to receive an operation from the user, and is used to input various operation instructions to the system control unit 50. As illustrated in FIG. 2, the operation unit 70 includes the mode selection switch 60, the shutter button 61, the power supply switch 72, the touch panel 70a, the delete button and other operation members. The other operation members of the operation unit includes, for example, the main electronic dial 71, the sub-electronic dial 73, the four-direction key 74, the SET button 75, the LV button 76, the magnifying button 77, the demagnifying button 78, the reproduction button 79 and the like.

The mode selection switch 60 switches the operation mode of the system control unit 50 to one of a still image capturing mode, a moving image capturing mode, a reproduction mode, and the like. The still image capturing mode includes: an auto image capturing mode, an auto scene determining mode, a manual mode, an aperture priority mode (Av mode), a shutter speed priority mode (Tv mode), and a program AE mode (P mode). Various scene modes in which image capturing setting are performed depending on the image capturing scene, and a custom mode are also included. If the mode selection switch 60 is used, the user can directly switch the operation mode of the system control unit 50 to one of the still image capturing mode, the moving image capturing mode, the reproduction mode, and the like. The user may select an image capturing mode list screen first using the mode selection switch 60, then select one of a plurality of modes displayed thereon, using another operation member. In the same manner, the moving image capturing mode may include a plurality of modes.

The shutter button 61 includes a first shutter switch 62 and a second shutter switch 64. The first shutter switch 62 turns ON in mid-operation of the shutter button 61, that is, in the half-depressed state (image capturing preparation instruction), and generates a first shutter switch signal SW1. By the first shutter switch signal SW1, the system control unit 50 starts such an operation as the auto focus (AF) processing, the auto exposure (AE) processing, the auto white balance (AWB) processing, and the pre-flash emission (FE) processing.

The second shutter switch 64 turns ON when operation of the shutter button 61 is completed, that is, in the fully depressed state (image capturing instruction), and generates a second shutter switch signal SW2. When the second shutter switch signal SW2 is generated, the system control unit 50 starts a series of the image capturing processing, from a step of reading signals from the imaging unit 22, to a step of writing the captured image in the recording medium 200 as image data.

Appropriate functions, depending on the scene, can be assigned to a part of the operation members of the operation unit 70 by selecting and operating various function icons displayed on the display unit 28, for example. Buttons to which various functions are assigned (function assigned buttons) operate, for example, as an end button, a return button, an image switching button, a jump button, a filter button, an attribute change button, a lock button, and the like. For example, if the lock button is pressed and the lock state is set, the digital camera 100 shifts to a state where a lock target operation member (hereafter lock target member) is disabled to prevent malfunction. If the lock button is pressed in the lock state, the digital camera 100 shifts to a state where the lock target member is enabled.

The touch panel 70a, which is a part of the operation unit 70, may be integrated with the display unit 28. For example, the touch panel 70a is configured such that the transmittance of light thereof does not interrupt display of the display unit 28, and is installed on the upper layer of the display surface of the display unit 28. Then the input coordinates on the touch panel 70a and the display coordinates on the surface of the display unit 28 are corresponded. Thereby a graphical user interface (GUI), as if the user could directly operate the screen displayed on the display unit 28, can be provided.

The system control unit 50 can detect the following operations on the touch panel 70a or states thereof.

a finger or a pen which does not touch the touch panel 70a initially touches the touch panel 70a, that is, the start of touch (hereafter Touch-Down)

a finger or a pen is touching the touch panel 70a (hereafter Touch-On)

a finger or a pen is moving on the touch panel 70a in the touched state (hereafter Touch Move)

a finger or a pen touching the touch panel 70a is released from the touch panel 70a, that is, the end of touch (hereafter Touch-Up)

nothing is touching the touch panel 70a (hereafter Touch-Off)

When Touch-Down is detected, Touch-On is detected simultaneously. Unless Touch-Up is after Touch-Down, Touch-On is continuously detected. When Touch-Move is detected as well, Touch-On is simultaneously detected. Even if Touch-On is detected, Touch-Move is not detected unless the touch position is moving. When Touch-Up of the finger and the pen is detected, Touch-Off is detected.

These operations/states and coordinates of the positions on the touch panel 70a, where a finger or a pen is touching, are notified to the system control unit 50 via the internal bus. On the basis of the notified information, the system control unit 50 determines which operation (touch operation) was performed on the touch panel 70a. On the basis of the moving direction of the finger or the pen moving on the touch panel 70a and the change of the positional coordinates thereof, the system control unit 50 can determine whether Touch-Move is performed for the vertical component and the horizontal component on the touch panel 70a respectively. In the case where Touch-Move for a predetermined distance or more is detected, the system control unit 50 determines that the slide operation was performed.

An operation of quickly moving a fingertip touching on the touch panel 70a and releasing the fingertip from the touch panel 70a is called a "flick". In other words, flick is an operation of quickly moving (flicking) the finger on the touch panel 70a. In a case where Touch-Move, for at least a predetermined distance at a predetermined speed or faster, is detected and Touch-Up is detected thereafter, the system control unit 50 can determine that flick was performed (the system control unit 50 can determine that flick occurred immediately after the slide operation).

A touch operation of touching a plurality of locations (e.g. two points) simultaneously and moving these touch positions close to each other is called a "Pinch-In", and the touch operation of moving these touch positions away from each other is called a "Pinch-Out". Pinch-In and Pinch-Out are collectively called a "pinch operation" (or simply "pinch"). The detection type of the touch panel 70a may be any one of the various types, such as a resistive film type, an electrostatic capacitive type, a surface acoustic wave type, an infrared type, an electromagnetic induction type, an image recognition type, and a photosensor type. Some types detect touch when the touch panel is actually contacted, while other types detect touch when a finger or a pen approaches the touch panel, but either type can be used.

Embodiment 1

In Embodiment 1, the digital camera 100 receives an operation (predetermined operation) performed by the user on a lock setting member to which the lock function is assigned, and presents the user information for releasing the lock in the case where the lock function is activated. The lock function is a function to set and release a lock state in which operation by the user for a lock target member is disabled. In the following description, it is assumed that the lock setting member is a lock setting/release button.

The digital camera 100 includes a plurality of function assigned buttons (first operation member) to which functions specified by the user can be assigned. The user can assign the lock function to at least one function assigned button which the user selected out of the plurality of function assigned buttons.

In the digital camera 100 main unit, a symbol to identify the button is printed on each function assigned button. The symbol printed on each function assigned button is a number, an alphabet, a mark, or the like. In the following description, it is assumed that the symbol printed on the function assigned button of the digital camera 100 main unit is a number (numeric character). When the information on the number, corresponding to the function assigned button to which the lock function is assigned, is displayed on the display unit 28 or the like, the user can easily set or release the lock state.

The lock function is a function to prevent the user from operating an operation member (e.g. button) unintentionally or in error. The operation member (second operation member, lock target member) for which the lock state is set or released may be set in advance or set by the user.

FIG. 3 is a flow chart exemplifying display processing for the lock setting/release information according to Embodiment 1. When the function assigned button (lock setting/release button), to which the lock function is assigned, is pressed and the lock function is activated, the digital camera 100 presents the user with information on the lock setting/release button. The lock setting/release button is a button to switch the lock state between ON/OFF by being pressed.

The processing of each step in the display processing for the lock setting/release information indicated in FIG. 3 is implemented by the system control unit 50 developing a program (stored in the non-volatile memory 56) in the system memory 52, and executing the program. The processing in FIG. 3 is started, for example, when the user turns the power of the digital camera 100 ON, or switches the operation mode of the digital camera 100 to the image capturing mode.

In step S301, the system control unit 50 shifts the digital camera 100 to the image capturing standby state. The image capturing standby state is a state where the digital camera 100 is waiting for an operation related to the image capturing performed by the user.

In step S302, the system control unit 50 determines whether the user pressed any button of the digital camera 100. Processing advances to step S303 if a button was pressed. Processing returns to step S302 is no button was pressed.

In step S303, the system control unit 50 acquires information on the function assigned to the pressed button. If the button pressed in step S302 is the function assigned button, the system control unit 50 reads the information on the function assigned to the button from the non-volatile memory 56.

The user can change the function assigned to the function assigned button. FIG. 4 is an example of a function assignment menu screen 400. The function assignment menu screen 400 in FIG. 4 displays an image of a plan view of the digital camera 100, where the function assigned button 401 corresponding to number 9 is highlighted. The user can, for example, select a key lock (lock function) from the list of the functions displayed in a sub-window (not illustrated), and assign this function to the function assigned button 401 indicated by number 9.

The function assignment menu screen 400 is not limited to the plan view of the digital camera 100, but may be an image viewed from a surface having the function assigned buttons, so that an operation to assign a selected function is received for the highlighted function assigned button. Thereby the user can assign desired functions to a plurality of function assigned buttons in the function assignment menu screen 400. The user may assign one function to a plurality of function assigned buttons.

The system control unit 50 correlates the number of the function assigned button and the information on the function assigned by the user, and stores this data in the non-volatile memory 56. The information on the function includes, for example, a value (set value) to specify the function to be assigned to the function assigned button, a name of the function, and the like. The system control unit 50 reads the number of the function assigned button and the information on the corresponding function from the non-volatile memory 56, whereby the function assigned to each function assigned button can be determined.

In step S304, on the basis of the information on the function acquired in step S303, the system control unit 50 determines whether or not the lock function is assigned to the button pressed in step S302. Processing advances to step S305 if the lock function is assigned. Processing returns to step S302 if the lock function is not assigned.

In step S305, the system control unit 50 determines whether the lock function is activated, that is, whether the lock target member is set to the lock state. Processing advances to step S306 if the lock target member is set to the lock state. Processing advances to step S307 if the lock target number is not set to the lock state.

In step S306, the system control unit 50 releases the lock function. In other words, the system control unit 50 releases the lock state of the lock target member. When the system control unit 50 releases the lock function, processing advances to step S309.

In step S307, the system control unit 50 activates the lock function and sets the lock target member to the lock state. Once the lock function is activated, operation that the user performed on the operation member that is set to the lock state is disabled.

In step S308, the system control unit 50 displays the information on the lock setting/release button on the display unit 28. For example, as the information on the lock setting/release button, the system control unit 50 displays the number of the function assigned button to which the lock function is assigned.

Figure 5A:
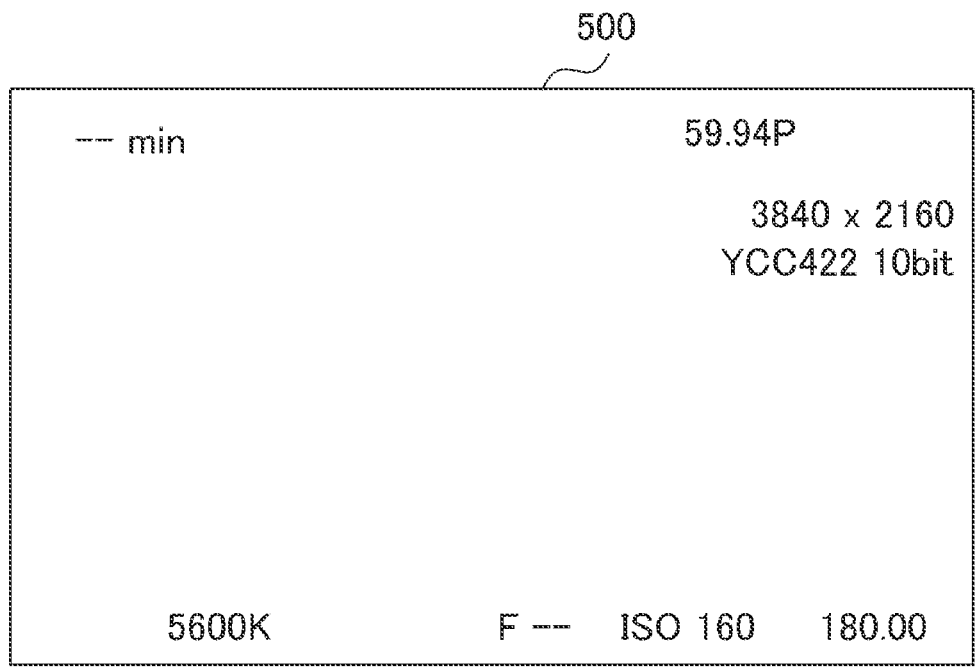
FIGS. 5A and 5B are screen examples displaying a lock setting/release button member in a lock state.

Display examples of the information on the function assigned button to which the lock function is assigned will be described with reference to FIGS. 5A and 5B. FIG. is a screen 500 before the lock function is activated. The screen 500 is a screen example when the digital camera 100 is shifted to the image capturing standby state in step S301.

Figure 5B:
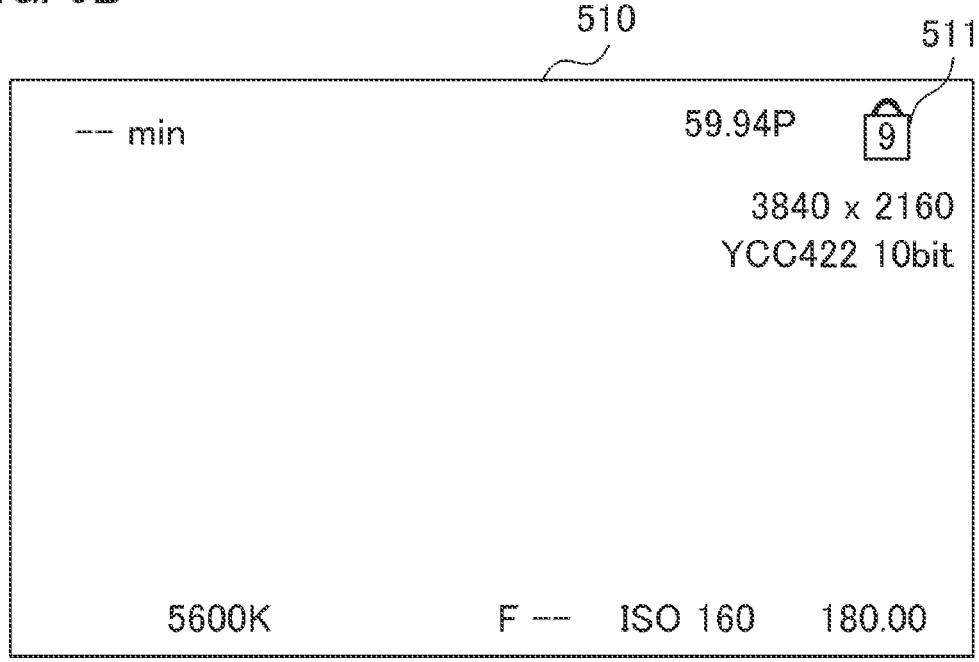

FIG. 5B is an example of the screen 510 in which the information on the lock setting/release button is displayed in the lock state where the lock function is activated. In the screen 510, an icon 511, which indicates that the lock target member is in the lock state, is displayed. In the icon 511, number 9, which corresponds to the lock setting/release button, is displayed. By displaying number 9 which corresponds to the lock setting/release button, the user can easily confirm the method for releasing the lock state. Therefore the user can easily release the lock state of the lock target member at a desired timing.

In the case where a plurality of lock setting/release buttons exist, the display unit 28 may display a plurality of members corresponding to the lock setting/release buttons respectively. However, even if a plurality of lock setting/release buttons exist, the display unit 28 may display only a number corresponding to the lock setting/release button (function assigned button) pressed in step S302. The number of the lock setting/release button may be displayed near the icon 511 instead inside the icon 511. The information on the lock setting/release button using the icon 511 is displayed until the lock state is released.

In step S309, the system control unit 50 determines whether the image capturing standby state ended. For example, the system control unit 50 can determine that the image capturing standby state ended when the image capturing started, or when the digital camera 100 switched to an operation mode other than the image capturing mode. Processing returns to step S302 if the image capturing standby state is not ended. If the image capturing standby state is ended, the display processing for the lock setting/release information indicated in FIG. 3 ends.

According to Embodiment 1, in the case where an operation (predetermined operation) on the lock setting/release button to set the lock target member to the lock state is received, the digital camera 100 displays the information on the lock setting/release button on the display unit 28. Thereby the digital camera 100 can support the user to release the lock state.

Modification of Embodiment 1

In Embodiment 1, in the case where the operation on the lock setting/release button is received from the user, and the lock target member is set to the lock state thereby, the information on the lock setting/release button is presented to the user. In the Modification of Embodiment 1, in a case where the operation on the lock setting/release button is received from the user, and the lock state is released thereby, the information on the lock setting/release button is presented to the user. In the Modification of Embodiment 1, after the lock state of the lock target member is released in step S306 in FIG. 3, the system control unit 50 displays the information on the lock setting/release button on the display unit 28. This modification of Embodiment 1 may be combined with Embodiment 1 and applied to the digital camera 100.

Figure 6:
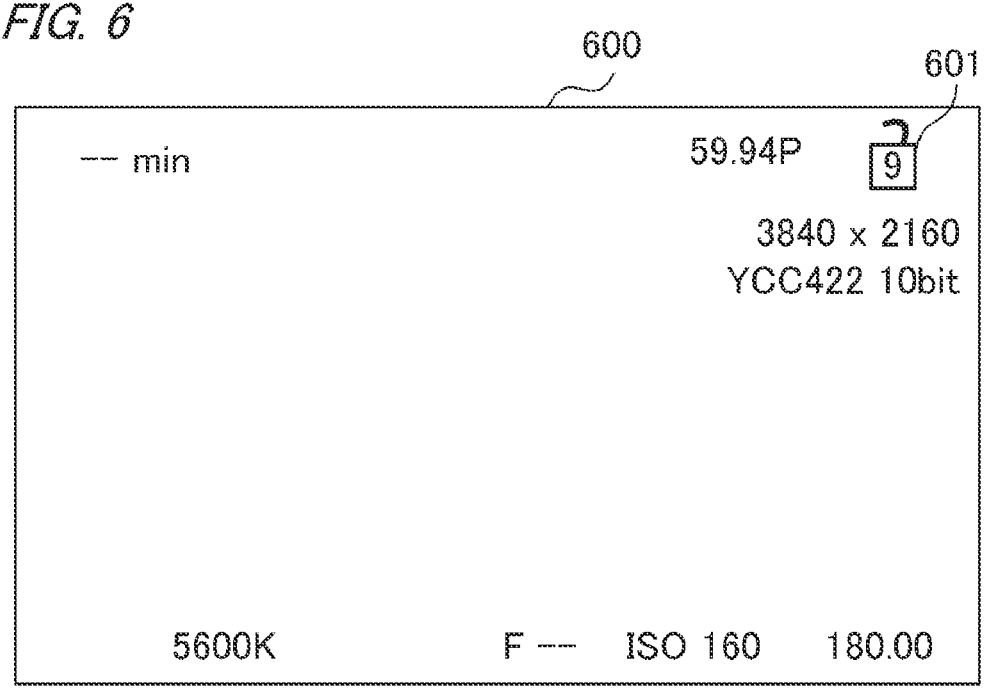
FIG. 6 is a screen example displaying the lock setting/release button in a lock release state.

FIG. 6 is an example of a screen 600 in which the information on the lock setting/release button is displayed in the lock release state. In the screen 600, an icon 601, which indicates that the lock target member is in the lock release state, is displayed. In the icon 601, number 9, which corresponds to the lock setting/release button, is displayed. By the display of number 9 corresponding to the lock setting/release button, the user can easily confirm the method for setting the lock state. Therefore the user can easily set the lock target member to the lock state at a desired timing.

In the case where a plurality of lock setting/release buttons exist, the display unit 28 may display a plurality of numbers corresponding to the lock setting/release buttons respectively. However, even if a plurality of lock setting/release buttons exist, only the number corresponding to the lock setting/release button (function assigned button) pressed to release the lock state may be displayed. The number of the lock setting/release button may be displayed near the icon 601 instead of inside the icon 601. The information on the lock setting/release button using the icon 601 may be displayed while the lock state is being released.

According to the above Modification, in the case where an operation (predetermined operation) on the lock setting/release button to release the lock state of the lock target member is received, the digital camera 100 displays information on the lock setting/release button on the display unit 28. Thereby even in the case where the lock state of the lock target member is released, the user can easily confirm the function assigned button to which the lock function is assigned, and set the lock target member to the lock state again. Thereby the digital camera 100 can support the user to set the lock state.

Embodiment 2

In Embodiment 1, when the operation on the lock setting/release button is received from the user, the digital camera 100 presents the user with information on the lock setting/release button. Whereas in Embodiment 2, when the operation (predetermined operation) on a lock target member which has been set to lock state is received from the user, the digital camera 100 presents the user with information on the lock setting/release button.

Just like Embodiment 1, the digital camera 100 includes a plurality of function assigned buttons (first operation member). The user can assign the lock function to at least one function assigned button which the user selected out of the plurality of function assigned buttons.

Figure 8:
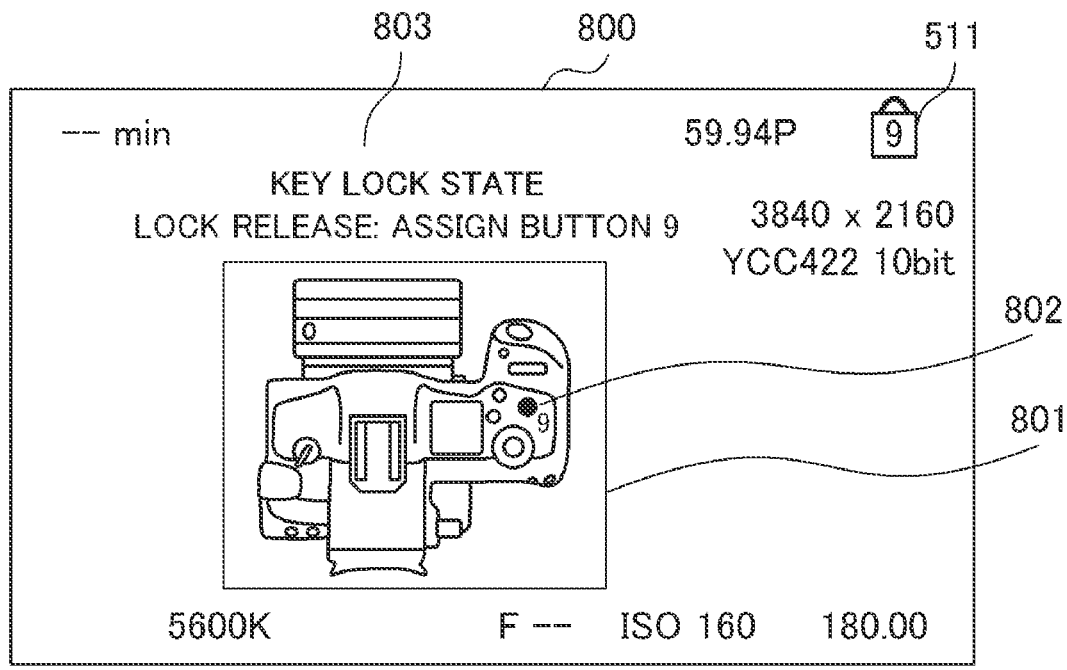
FIG. 8 is a screen example displaying a position of the lock setting/release button.

FIG. 8 is a flow chart exemplifying display processing on the setting release information according to Embodiment 2. When a lock setting/release button is pressed in a state where the lock target member is locked, the digital camera 100 presents the user with the information on the lock setting/release button.

Figure 7:
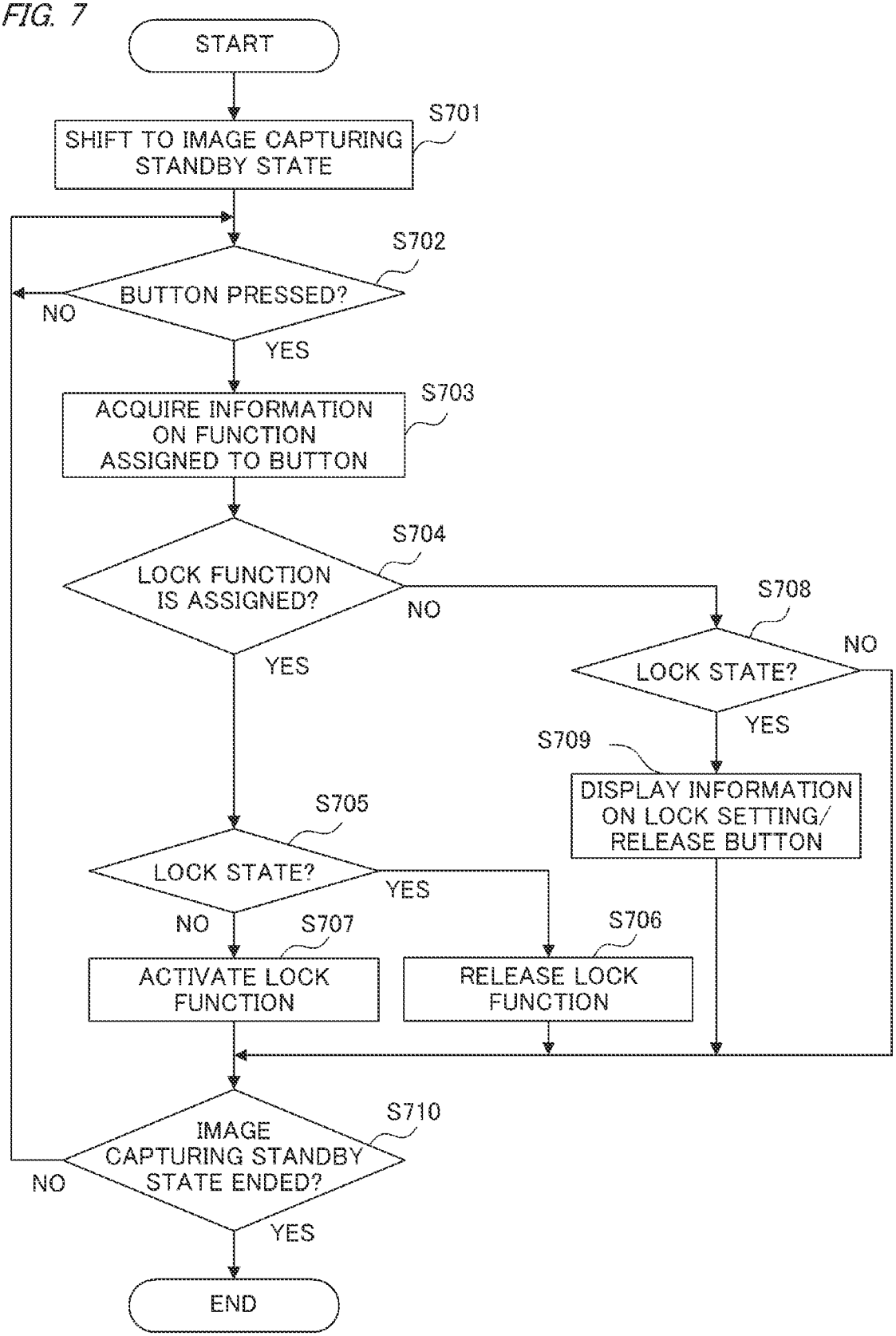
FIG. 7 is a flow chart depicting display processing for lock setting/release information in Embodiment 2.

The processing of each step in the display processing for the lock setting/release information indicated in FIG. 7 is implemented by the system control unit 50 developing a program (stored in the non-volatile memory 56) in the system memory 52, and executing the program. The processing in FIG. 7 is started, for example, when the user turns the power of the digital camera 100 ON, or switches the operation mode of the digital camera 100 to the image capturing mode.

The processing steps in step S701 to step S707 are the same as the processing steps in step S301 to step S307 in FIG. 3 respectively, hence detailed descriptions thereof are omitted, and processing steps that are different from FIG. 3 will be described. After the lock function is released in step S706, and after the lock function is activated in step S707, processing advances to S710.

In step S704, the system control unit 50 determines whether the lock function is assigned to the button pressed in step S702. Processing advances to step S708 if the lock function is not assigned to the button pressed in step S702.

In step S708, the system control unit 50 determines whether the button pressed in step S702 is the lock target member and is set to the lock state. Processing advances to step S709 if the button pressed in step S702 is in the lock state. Processing advances to step S710 if the button pressed in step S702 is not in the lock state.

In step S709, the system control unit 50 displays information on the lock setting/release button on the display unit 28. If the lock target member is set to the lock state, the operation that the user performed on the lock target member is disabled. By the display of information on the lock setting/release button on the display unit 28, the user can easily confirm the method for releasing the lock state. Therefore the user can release the lock state at a desired timing, so as to enable the operation that the user performs on the lock target member.

The information on the lock setting/release button displayed in step S709 may be an icon 511 which is displayed with the number of the function assigned button, just like FIG. 5B. The system control unit 50 may display a physical position of the lock setting/release button as the information on the lock setting/release button. FIG. 8 is an example of a screen 800 where the position of the lock setting/release button is displayed. In the case of FIG. 8, the lock setting/release button is assigned to the function assigned button (assign button) indicated by number 9.

The screen 800 displays an image 801 of the digital camera 100 that indicates a position of the lock setting/release button 802. In the image 801 of the digital camera 100, the lock setting/release button 802 is highlighted by a color that is different from other buttons. The lock setting/release button 802 may be indicated by a flashing display or the like, as long as it is displayed differently than other buttons. Further, the screen 800 may display a message 803 to notify the user that the lock target member is in the lock state (in key lock state), and the lock setting/release button 802 is assigned to the assign button 9. Furthermore, the screen 800 may display an icon 511 which indicates that lock is set, just like FIG. 5B.

The system control unit 50 may hide the display of the image 801 and the message 803 when a predetermined time (e.g. 5 seconds) elapses since the button for the lock target member is pressed in step S702. When the display of the information on the position of the lock setting/release button is hidden, the display unit 28 returns the display to the state before the lock target member is pressed in step S702. Even in the case where the display of the information on the position of the lock setting/release button is hidden, the icon 511, that indicates that the lock is set, may remain displayed.

In step S710, the system control unit 50 determines whether the image capturing standby state ended, just like step S309 in FIG. 3. Processing returns to step S702 if the image capturing standby state is not ended. If the image capturing standby state is ended, the display processing for the lock setting/release information indicated in FIG. 7 ends.

In Embodiment 2, the information on the lock setting/release button is displayed in the case where the button for the lock target member in the lock state is pressed, but may also be displayed when the lock setting/release button is pressed, integrating with Embodiment 1. In other words, after the lock function is released in step S706, the system control unit 50 may display the information on the lock setting/release button, just like the Modification of Embodiment 1. Further, just like Embodiment 1, the system control unit 50 may display the information on the lock setting/release button after activating the lock function in step S707.

According to Embodiment 2, in the case where an operation (predetermined operation) on the lock setting/release button which is set in the lock state is received, the digital camera 100 displays the information on the lock setting/ release button on the display unit 28. Hence even in a case where the lock target member in the lock state is operated and the desired function is not executed, the user can easily release the lock state based on the information displayed on the display unit 28. Thereby the digital camera 100 can support the user to release the lock state.

In the examples of Embodiment 1 and Embodiment 2, the information on the lock setting/release button is displayed when a predetermined operation is received in the image capturing standby state, but display of the information on the lock setting/release button is not limited to the display in the image capturing standby state. Each embodiment is applicable to an electronic apparatus that includes the lock function, and is in a state where operation from the user can be received.

However, the system control unit 50 may control such that the information on the lock setting/release button is not displayed in a case where visibility is interrupted during image capturing, such as the case of capturing a moving image with the digital camera 100. For example, in the case where the information on the lock setting/release button is displayed, the system control unit 50 hides the display of the information on the lock setting/release button when the user starts capturing a moving image. The system control unit 50 also controls to not display the information while a moving image is being captured on the lock setting/release button when predetermined operation is received from the user. By hiding the display of the lock setting/release button during moving image capture, the user can easily confirm the screen of the display unit 28, and concentrate on image capturing.

While preferred embodiments of the present invention have been described, the present invention is not limited to these embodiments, and these embodiments may be modified and changed in various ways within the scope of the spirit of the invention.

According to the present disclosure, a technique to support setting and releasing of the lock state for operation members can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-097281, filed on Jun. 16, 2022, which is hereby incorporated by reference herein in its entirety.

What is claimed is:

1. An electronic apparatus that includes a lock function in which operation by a user for operation members is disabled, the electronic apparatus comprising:
   a plurality of operation members to which functions specified by the user are assignable; and
   at least one memory and at least one processor which function as:
      an assignment unit configured to assign the lock function to at least one first operation member which the user has selected out of the plurality of the operation members;
      a control unit configured to switch a state of a second operation member to be a target of the lock function between a lock state and a lock release state, responding to an operation on the first operation member; and
      a display control unit configured to control such that information indicating the first operation member to which the lock function is assigned is displayed with information indicating the lock function on a display unit in a case where a predetermined operation is received from the user.

2. The electronic apparatus according to claim 1, wherein the predetermined operation is an operation for the first operation member to set the second operation member to the lock state.

3. The electronic apparatus according to claim 1, wherein the second operation member to be a target of the lock function is set by the user.

4. The electronic apparatus according to claim 1, wherein the predetermined operation is an operation for the first operation member to set the second operation member to the lock release state.

5. The electronic apparatus according to claim 1, wherein the predetermined operation is an operation for the second operation member in the lock state.

6. The electronic apparatus according to claim 5, wherein the information indicating the first operation member to which the lock function is assigned includes an image that indicates a position of the first operation member, and
   the display control unit hides the display of the image after a predetermined time elapsed from the reception of the predetermined operation.

7. The electronic apparatus according to claim 1, further comprising an imaging device, wherein
   the display control unit does not display information on the first operation member while recording a moving image captured by the imaging device.

8. The electronic apparatus according to claim 1, wherein in a case where there are a plurality of first operation members to which the lock function is assigned, the display control unit displays a plurality pieces of information indicating each of the plurality of the first operation members.

9. The electronic apparatus according to claim 1, wherein in a case where there are a plurality of first operation members to which the lock function is assigned, the display control unit displays information indicating the first operation member on which the predetermined operation is performed, out of the plurality of the first operation members.

10. The electronic apparatus according to claim 1, wherein
the information indicating the first operation member is information on a symbol to identify the first operation member, and
the information indicating the lock function is an icon indicating the lock function.

11. The electronic apparatus according to claim 10, wherein
the display control unit controls such that the symbol is displayed within the icon.

12. The electronic apparatus according to claim 11, wherein
the icon indicating the lock function is a first icon indicating the lock state or a second icon indicating the lock release state,
in a case where the second operation unit is in the lock state, the display control controls such that the information on the symbol identifying the first operation member is displayed within the first icon, and in a case where the second operation unit is in the lock release state, the display control controls such that the information on the symbol identifying the first operation member is displayed within the second icon.

13. A control method for an electronic apparatus that includes a lock function in which operation by a user for operation members is disabled, the control method comprising:
assigning the lock function to at least one first operation member which the user has selected out of a plurality of operation members to which functions specified by the user are assignable;
switching a state of a second operation member to be a target of the lock function between a lock state and a lock release state, responding to an operation on the first operation member; and
controlling such that information indicating the first operation member to which the lock function is assigned is displayed with information indicating the lock function on a display unit in a case where a predetermined operation is received from the user.

14. A non-transitory computer-readable storage medium that stores a program for causing a computer to execute a control method for an electronic apparatus that includes a lock function in which operation by a user for operation members is disabled, the control method comprising:
assigning the lock function to at least one first operation member which the user has selected out of a plurality of operation members to which functions specified by the user are assignable;
switching a state of a second operation member to be a target of the lock function between a lock state and a lock release state, responding to an operation on the first operation member; and
controlling such that information indicating the first operation member to which the lock function is assigned is displayed with information indicating the lock function on a display unit in a case where a predetermined operation is received from the user.

* * * * *